Dec. 3, 1963  J. L. THOMASON  3,112,778
SAW BLADE GUARD
Filed July 6, 1962
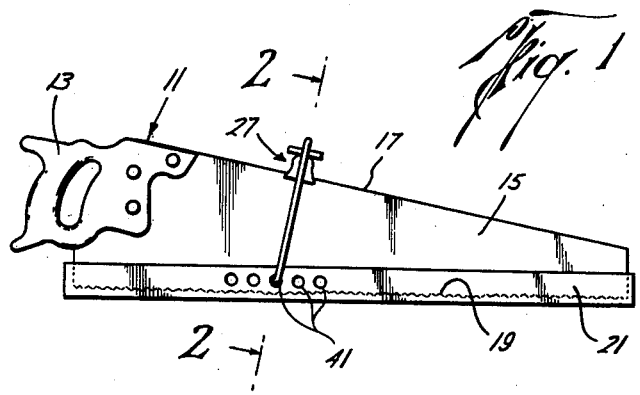
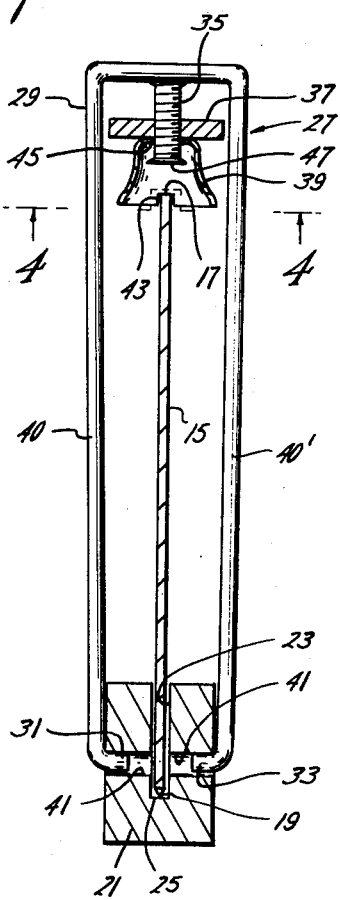
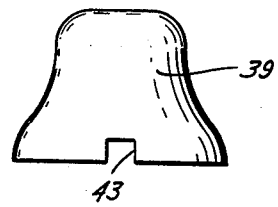
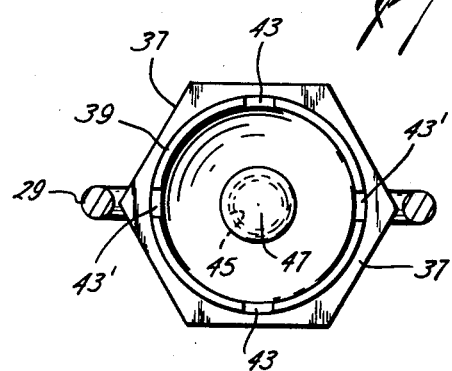
James L. Thomason
INVENTOR.
BY William D. Harris, Jr.
ATTORNEY

United States Patent Office 3,112,778
Patented Dec. 3, 1963

3,112,778
SAW BLADE GUARD
James L. Thomason, 1903 Runnels St., Big Spring, Tex.
Filed July 6, 1962, Ser. No. 207,941
4 Claims. (Cl. 145—35)

This invention relates to guards for saw blades.

It has been a problem through the years that the teeth of saw blades are frequently bent, dulled, or otherwise damaged by contact with various objects while the saw is not in use. Accordingly, various types of saw blade guards have been proposed and used.

The guards of the past and those now in use have certain defects: They don't stay in place securely, and/or they are difficult to install and remove from the saw, and/or they are not durable, and/or they are of complex construction; and/or they are not capable of accommodating a range of saw sizes.

Accordingly, it is an object of my invention to provide an efficient saw blade guard, comprising a sheath and novel support means that may be simply and securely installed and removed. It is a further object to provide such a sheath and support means that are of a simple, economical construction. It is yet a further object to provide such a sheath and support means that are capable of accommodating a wide range of saw sizes.

My new saw guard comprises a sheath means to protect the cutting edge of a saw, and relatively rigid, adjustable support means that clamp downward on the upper edge of the saw blade to hold the sheath means in place.

Other and further objects and advantages of this invention will further become apparent hereinafter and in the drawings, in which:

FIGURE 1 is an elevation of a saw sheathed with my new saw guard;

FIGURE 2 is a section taken along 2—2 of FIGURE 1;

FIGURE 3 is an elevation of the saw clamping piece employed in the illustrated embodiment of my invention; and FIGURE 4 is a section along 4—4 of FIGURE 2, with the saw blade omitted from the view for clarity.

Referring now to the drawings, 11 is a conventional hand saw having handle 13 and blade 15, with upper edge 17 and lower cutting edge 19, which has a plurality of conventional saw teeth.

Protective sheath 21 extends at least the length of lower cutting edge 19, and in the embodiment represented in the accompanying drawings, extends somewhat beyond the cutting edge on either end.

Sheath 21 has a slot 23 (see FIGURE 2) running its entire length. It is thus uniformly U-shaped in cross section. The width of slot 23 is somewhat greater than the thickness of saw blade 15, thus permitting the blade to be thrust into slot 23 until the cutting edge 19 strikes the bottom 25 of slot 23. It will be appreciated that so long as sheath 21 is supported in position encasing lower cutting edge 19 from end to end, that the teeth of saw blade 15 will be protected from being bent, dulled, or otherwise damaged from contact with extraneous objects.

Sheath 21 is maintained in position encasing the lower cutting edge 19 by novel support means 27, which comprises an inverted U-shaped (as viewed in FIGURE 2) bail 29 having internal, oppositely opposed ends 31 and 33; downwardly extending threaded stud 35; nut 37 riding on stud 35; and saw clamping piece 39.

Attention is directed to the manner in which bail 29, with its legs 40 and 40′, is attached to sheath 21. As seen in FIGURE 1, a plurality of retainer holes 41 are spaced lengthwise along sheath 21. As seen best in FIGURE 2, the oppositely opposed bail ends 31 and 33 are secured in a pair of aligned retainer holes 41 on opposite sides of sheath 21. While retainer holes 41 are shown passing through sheath 21, it is apparent that they need merely to extend far enough into sheath 21 to receive and support bail ends 31 and 33.

Bail 29 is relatively rigid; however, it possesses enough resilience to permit installation by pulling apart its legs 40 and 40′ sufficiently to permit bail ends 31 and 33 to clear the width of sheath 21 and be aligned opposite a registered pair of holes 41. On releasing the legs of bail 29, the bail ends 31 and 33 snap into place in retainer holes 41. Removal is obviously accomplished by the reversal of this procedure.

Saw clamping piece 39 is generally bell-shaped, with 2 pairs of oppositely opposed slots 43 and 43′ cut into the lower-most walls of the bell, as best seen in FIGURES 3 and 4. As shown in the drawings, slots 43 serve the function of receiving and engaging upper saw blade edge 17. Slots 43′ are an extra pair provided for convenience so that if piece 39 is situated with its slots 43 or 43′ out of position while sheath 21 is being secured on a saw blade, that a maximum rotation of piece 39 through 45° will bring a pair of slots, either 43 or 43′, as the case may be, into alignment to receive upper saw blade edge 17.

It will be observed from FIGURE 2 that bell-shaped saw clamping piece 39 has an opening 45 in its uppermost central portion, and that threaded stud 35 projects downwardly through this opening 45. Since opening 45 is considerably greater in diameter than threaded stud 35, clamping piece 39 is free to move up and down on stud 35, between the limits of nut 37, which stops its upward movement, and diametrically enlarged stud end 47, which is greater in diameter than opening 45, and which, therefore, stops its downward movement and keeps it from dropping free of stud 35 when the support means 27 are not engaged to sheath a saw.

FIGURE 2, in section, illustrates sheath 21 encasing a saw blade, with support means 27 properly adjusted to hold sheath 21 tightly in place. It will be observed that the lower portion of blade 15 rides in slot 23, with cutting edge 19 resting against bottom 25 of slot 23. Upper edge 17 of saw blade 15 is engaged in slots 43 in saw clamping piece 39, which is pressed downward on blade edge 17 by nut 37.

To remove sheath 21 from engaged position on a saw blade is a simple matter. Nut 37 is merely rotated upwardly a short distance with the fingers. The saw 11 is pulled leftward, as viewed in FIG. 1, out of sheath 21. Saw clamping piece 39 does not interfere since nut 37 is not bearing down to force it against the saw blade edge 17.

To sheath a saw is, likewise, a simple operation. Nut 37 is turned to position it rather close to the upper end of stud 35, thus giving clamping means 39 clearance to move upwardly a considerable distance on stud 35. The saw is pushed into sheath 21, blade end first, and moved until the entire cutting edge 19 is encased with sheath 21. Clamping means 39 is positioned with slots 43 (or 43′, if desired) receiving the upper edge 17 of blade 15. Nut 37 is then turned down with the fingers until it presses tightly against the top of bell-shaped clamping means 39.

Attention is directed to the plurality of holes 41 in sheath 21. As various saw blades have different widths and different shapes for their upper edges (note in FIG. 1 that upper edge 17 slopes downwardly to the right, while cutting edge 19 is horizontal), it will be appreciated that a problem is presented in providing a support means for a sheath that will accommodate a wide range of blade widths and slopes. Spaced holes 41 provide such a wide range of adjustment. For example, suppose a considerably wider saw than the one pictured in FIGURE 1, but with the same slope for its upper edge, is to be encased in sheath 21. Bail 29 is simply moved (as explained previously herein) from its center position in the five-spaced, oppositely opposed pairs of holes 41 to a pair of oppositely opposed holes to the right; for example, the oppositely opposed pair on the far right. For a considerably narrower saw than pictured in FIG. 1, bail 41 would be positioned to the left in an appropriate hole pair. It is believed that the wide range of accommodation possible is now apparent without further explanation.

I prefer that sheath 21 be made of wood and that all parts of my retaining means 27 be made of metal, although departures may be made from these materials in certain instances without impairing the utility of my invention.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

I claim:
1. A protector for the teeth of a saw blade comprising
   (1) an elongated sheath having a saw tooth receiving groove running from end to end thereof;
   (2) a rigid, U-shaped bail member with the ends of each leg of the U turned toward the other leg;
   (3) said turned-in leg ends connected to opposite sides of said sheath intermediate the ends of said sheath with the legs of said bail member extending adjacent said saw tooth receiving groove and outwardly from said sheath;
   (4) a threaded stud joined to the central member of said bail and extending in the direction of and parallel to the legs of said bail;
   (5) saw edge clamping means movably mounted on said stud and having a slot formed therein adapted to engage the upper edge of a saw blade; and
   (6) a nut threadedly engaged on said stud intermediate said saw edge clamping means and the central member of said bail, whereby when a saw is inserted with its teeth encased by said sheath, said nut may be tightened to force said saw edge clamping means downwardly into tight engagement with the upper edge of a saw.

2. A protector for the teeth of a saw blade comprising
   (1) an elongated sheath of U-shaped cross section, said sheath having sides that define the legs of said U-shape and a bottom defining the intermediate portion of said U-shape;
   (2) said sides being spaced apart wider than the width of a saw blade whereby said sheath is adapted to receive a saw blade thrust therein with the teeth toward the bottom of said sheath;
   (3) a bail having two parallel sides and being joined intermediate its ends with a center piece;
   (4) one side of said bail being connected adjacent its end to one side of said sheath and the other side of said bail being connected adjacent its end to the other side of said sheath, so that said bail straddles said sheath;
   (5) said legs of said bail extending outwardly from said sheath from their point of connection therewith with said center piece of said bail spaced from said sheath and above said sheath;
   (6) a threaded stud connected to the center piece of said bail and extending in the direction of said sheath;
   (7) a saw blade engaging clamp movably mounted on said stud; and
   (8) a nut intermediate said engaging clamp and said center piece in threaded engagement with said stud and movable thereon by rotation thereof whereby said nut may be rotated to force it against said engaging clamp and cause said engaging clamp to move in the direction of said sheath and engage the top edge of a saw disposed in said sheath with its blade straddled by the legs of said bail.

3. A protector for the teeth of a saw blade comprising
   (1) an elongated sheath having spaced apart sides, a bottom portion, and an open top running the length thereof;
   (2) a U-shaped bail member with each end of the U attached to the sides of said sheath, and with the legs of said U extending past said open top so that the central portion of said U lies above the open top of said sheath.
   (3) a threaded stud joined to and extending downwardly from the central portion of said U toward said sheath;
   (4) saw blade edge engaging means movably mounted on said stud; and
   (5) a nut in threaded engagement with said stud mounted intermediate said saw blade edge engaging means and the central portion of said U.

4. A protector for the teeth of a saw blade comprising
   (1) an elongated sheath having spaced apart sides, a bottom portion, and an open top running the length thereof;
   (2) a plurality of holes in the sides of said sheath and spaced apart lengthwise there along, to define a series of pairs of openings on opposite sides of said sheath in register;
   (3) a U-shaped bail member with each end of the U having oppositely opposed turned-in feet;
   (4) one of the oppositely opposed turned-in feet being engaged in one of a pair of said oppenings in register, and the other of said oppositely opposed turned-in feet being engaged in the other of said openings in register;
   (5) each leg of said U extending past said open top so that the central portion of said U lies above the open top of said sheath;
   (6) retractable saw edge clamping means extending downwardly from the central portion of said U;
   (7) and screw means for moving said retractable saw edge clamping means downwardly toward said sheath.

References Cited in the file of this patent
UNITED STATES PATENTS
Re. 23,581    Roberts _____ Nov. 11, 1952
FOREIGN PATENTS
119,514    Germany _____ July 20, 1899